(12) United States Patent
Kang et al.

(10) Patent No.: US 10,197,719 B2
(45) Date of Patent: Feb. 5, 2019

(54) DISPLAY DEVICE

(71) Applicant: Samsung Display Co., Ltd., Yongin-Si, Gyeonggi-Do (KR)

(72) Inventors: Euijeong Kang, Suwon-si (KR); Sehee Jeon, Seoul (KR); Junghoon Shin, Seongnam-si (KR); Hayoung Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/219,656

(22) Filed: Jul. 26, 2016

(65) Prior Publication Data

US 2017/0184775 A1    Jun. 29, 2017

(30) Foreign Application Priority Data

Dec. 23, 2015 (KR) ................ 10-2015-0185247

(51) Int. Cl.
   *F21V 7/04* (2006.01)
   *F21V 8/00* (2006.01)
   *G02F 1/1335* (2006.01)

(52) U.S. Cl.
   CPC ......... *G02B 6/0045* (2013.01); *G02B 6/0035* (2013.01); *G02B 6/0046* (2013.01); *G02B 6/0058* (2013.01); *G02B 6/0091* (2013.01); *G02F 1/133615* (2013.01)

(58) Field of Classification Search
   CPC .. G02B 6/0045; G02B 6/0046; G02B 6/0058; G02F 1/133615
   See application file for complete search history.

(56) References Cited

U.S. PATENT DOCUMENTS

| | | | | |
|---|---|---|---|---|
| 4,729,185 A | * | 3/1988 | Baba ................... | G02B 6/0021 362/615 |
| 9,541,780 B2 | * | 1/2017 | Moon .................. | G02F 1/1333 |
| 2008/0151576 A1 | | 6/2008 | Inditsky | |
| 2009/0316062 A1 | * | 12/2009 | Nishizawa ........ | G02F 1/133305 349/58 |
| 2010/0289983 A1 | * | 11/2010 | Rocard ............. | B29D 11/0074 349/62 |

(Continued)

FOREIGN PATENT DOCUMENTS

| KR | 1020030035158 A | 5/2003 |
|---|---|---|
| KR | 200319900 Y1 | 7/2003 |

(Continued)

*Primary Examiner* — Sean Gramling
(74) *Attorney, Agent, or Firm* — Cantor Colburn LLP

(57) ABSTRACT

A display device includes a display panel curved with respect to a plane defined by a first direction and a second direction crossing the first direction and about a first reference axis substantially parallel to the first direction, a light guide plate disposed under the display panel and including a first surface facing the display panel and a second surface facing the display panel such that the first surface is disposed between the second surface and the display panel, a light source which provides a light to the light guide plate, and a bottom chassis which accommodates the light guide plate and the light source. The first surface is curved with respect to the plane about a second reference axis substantially parallel to the first direction, and the second surface is substantially parallel to the plane.

13 Claims, 11 Drawing Sheets

(56) References Cited

U.S. PATENT DOCUMENTS

| | | | | |
|---|---|---|---|---|
| 2015/0036077 A1* | 2/2015 | Lee | ...................... | G02B 6/0081 |
| | | | | 349/65 |
| 2016/0291386 A1* | 10/2016 | Wang | ........................ | G02B 6/00 |
| 2016/0360628 A1* | 12/2016 | Yu | ........................ | G02B 6/0088 |

FOREIGN PATENT DOCUMENTS

| KR | 100491063 B1 | 5/2005 |
|---|---|---|
| KR | 100914875 B1 | 8/2009 |
| KR | 101267081 B1 | 5/2013 |
| KR | 1020140007202 A | 1/2014 |
| KR | 101567155 B1 | 11/2015 |

\* cited by examiner

DISPLAY DEVICE

This application claims priority to Korean Patent Application No. 10-2015-0185247, filed on Dec. 23, 2015, and all the benefits accruing therefrom under 35 U.S.C. § 119, the content of which in its entirety is herein incorporated by reference.

BACKGROUND

1. Field

The disclosure relates to a display device. More particularly, the disclosure relates to a display device having a curved display surface.

2. Description of the Related Art

In recent years, as the market demand for flexible display devices other than a flat panel display device continues to increase, various flexible display devices, such as a curved display device, a rollable display device, a stretchable display device, etc., have been researched.

SUMMARY

The disclosure provides a display device having improved reliability and display quality.

An embodiment of the inventive concept provides a display device including a display panel curved with respect to a plane defined by a first direction and a second direction crossing the first direction and about a first reference axis substantially parallel to the first direction, a light guide plate disposed under the display panel and including a first surface facing the display panel and a second surface facing the display panel such that the first surface is disposed between the second surface and the display panel, a light source which provides a light to the light guide plate, and a bottom chassis which accommodates the light guide plate and the light source. In such an embodiment, the first surface is curved with respect to the plane about a second reference axis substantially parallel to the first direction, and the second surface is substantially parallel to the plane.

In an embodiment, the display panel may have a first radius of curvature, and the first surface of the light guide plate may have a second radius of curvature equal to the first radius of curvature.

In an embodiment, the second surface of the light guide plate may include an optical pattern defined thereon.

In an embodiment, a first distance between the display panel and the second surface of the light guide plate at a first position in a center of the display panel may be greater than a second distance between the display panel and the second surface of the light guide plate at a second position of the display panel spaced apart from the first position in the second direction, and a first thickness of a portion of the light guide plate overlapping the first position may be greater than a second thickness of a portion of the light guide plate overlapping the second position when viewed in the plan view.

In an embodiment, a first distance between the display panel and the second surface of the light guide plate at a first position in a center of the display panel may be smaller than a second distance between the display panel and the second surface of the light guide plate at a second position of the display panel spaced apart from the first position in the second direction, and a first thickness of a portion of the light guide plate overlapping the first position may be smaller than a second thickness of a portion of the light guide plate overlapping the second position when viewed in a plan view.

In an embodiment, the bottom chassis may include a bottom portion including a first bottom surface facing the second surface of the light guide plate and a second bottom surface facing the first bottom surface and a sidewall portion bent and extending from the bottom portion, the first bottom surface may be disposed between the light guide plate and the second bottom surface, and the first bottom surface may be substantially parallel to the plane.

In an embodiment, the second bottom surface may be substantially parallel to the first bottom surface.

In an embodiment, the second bottom surface may have a shape different from a shape of the first bottom surface.

In an embodiment, the display panel may include a first portion, a second portion and a third portion, which are sequentially arranged in the second direction, the first surface of the light guide plate may include a first portion overlapping the first portion, a second portion overlapping the second portion, and a third portion overlapping the third portion when viewed in a plan view, the first and third portions of the display panel and the first and third portions of the first surface of the light guide plate may be curved with respect to the plane, and the second portion of the display panel and the second portion of the first surface of the light guide plate may be substantially parallel to the plane.

Another embodiment of the inventive concept provides a display device including a display panel curved in a second direction and about a reference axis extending in a first direction crossing the second direction, a light guide plate disposed under the display panel and including a first surface curved with respect to the second direction and a second surface facing the first surface and substantially parallel to a plane defined by the first and second directions, a light source which provides a light to the light guide plate, and a bottom chassis disposed under the light guide plate and including a bottom surface substantially parallel to the second surface.

In an embodiment, the light guide plate may further include a first side surface, a second side surface, a third side surface and a fourth side surface, where the first to fourth side surfaces connect the first surface and the second surface, the first and second side surfaces may be spaced apart from each other in the first direction to face each other, the third and fourth side surfaces may be spaced apart from each other in the second direction to face each other, and the light source may be disposed to face at least one of the third and fourth side surfaces to provide the light to the light guide plate.

In an embodiment, a width in a third direction, which is substantially vertical to the bottom surface, of each of the third and fourth side surfaces may be constant.

In an embodiment, a width in the third direction of the first side surface may decrease as a distance from a center of the first side surface increases, and a width in the third direction of the second side surface may decrease as a distance from a center of the second side surface increases.

In an embodiment, a width in the third direction of the first side surface may increase as a distance from a center of the first side surface increases, and a width in the third direction of the second side surface may increase as a distance from a center of the second side surface increases.

In an embodiment, the display panel may include a first portion curved with respect to the second direction, a second portion extending from the first portion and substantially parallel to the bottom surface, and a third portion extending from the second portion and curved with respect to the second direction, and the first surface of the light guide plate includes a first portion curved with respect to the second direction, a second portion extending from the first portion and substantially parallel to the bottom surface, and a third portion extending from the second portion and curved with respect to the second direction.

In an embodiment, the first portion of the display panel may overlap with the first portion of the first surface of the light guide plate when viewed in a plan view, the second portion of the display panel may overlap the second portion of the first surface of the light guide plate when viewed in the plan view, and the third portion of the display panel may overlap the third portion of the first surface of the light guide plate when viewed in the plan view.

In an embodiment, the display panel and the first surface of the light guide plate may be curved at a same radius of curvature.

In an embodiment, a distance in a third direction substantially vertical to the bottom surface between the display panel and the first surface of the light guide plate may be constant.

In an embodiment, the display panel may be curved at a first radius of curvature, the first surface of the light guide plate may be curved at a second radius of curvature, and a center of the first radius of curvature may be substantially the same as a center of the second radius of curvature.

Another embodiment of the inventive concept provides a display device including a display panel having a curved shape, a light guide plate disposed under the display panel, a light source which provides a light to the light guide plate, and a bottom chassis disposed under the light guide plate. In such an embodiment, the light guide plate includes an upper surface having a curved shape corresponding to the curved shape of the display panel and a lower surface facing the upper surface and having a shape different from the curved shape of the upper surface.

According to embodiments described herein, the light guide plate and the bottom chassis are easily coupled to each other without being bending the light guide plate, and thus a manufacturing yield is improved. In such embodiments, the backlight unit is effectively prevented from being deformed, such that a reliability of the display device is improved.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
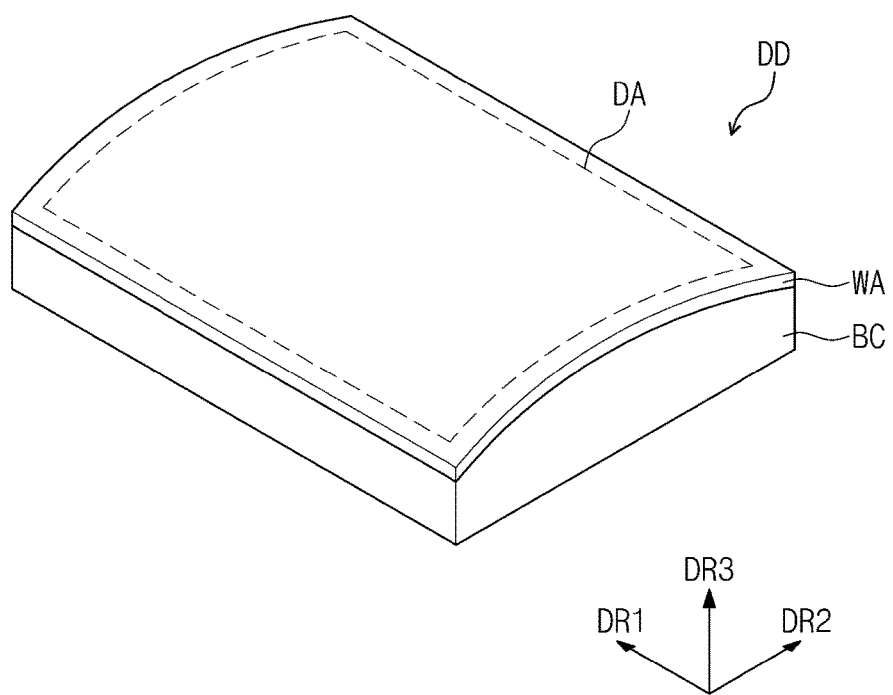
FIG. 1 is a perspective view showing a display device according to an exemplary embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a perspective view showing a display device DD according to an exemplary embodiment of the disclosure.

Referring to FIG. 1, an exemplary embodiment of the display device DD displays an image through a curved display surface DA. The display surface DA is curved in a second direction DR2 with respect to a plane defined by a first direction DR1 and the second direction DR2.

The display device DD may be included in or applied to various electronic devices, such as a center information display ("CID") for a car, a wrist-type electronic device, a personal digital assistant, a portable multimedia player, a game unit, a tablet personal computer ("PC"), a smart phone, a large-sized electronic item, e.g., a television set, an outdoor billboard, etc., and a small and medium-sized electronic item, e.g., a personal computer, a notebook computer, a car navigation unit, a camera, etc., but not being limited thereto or thereby.

Figure 2:
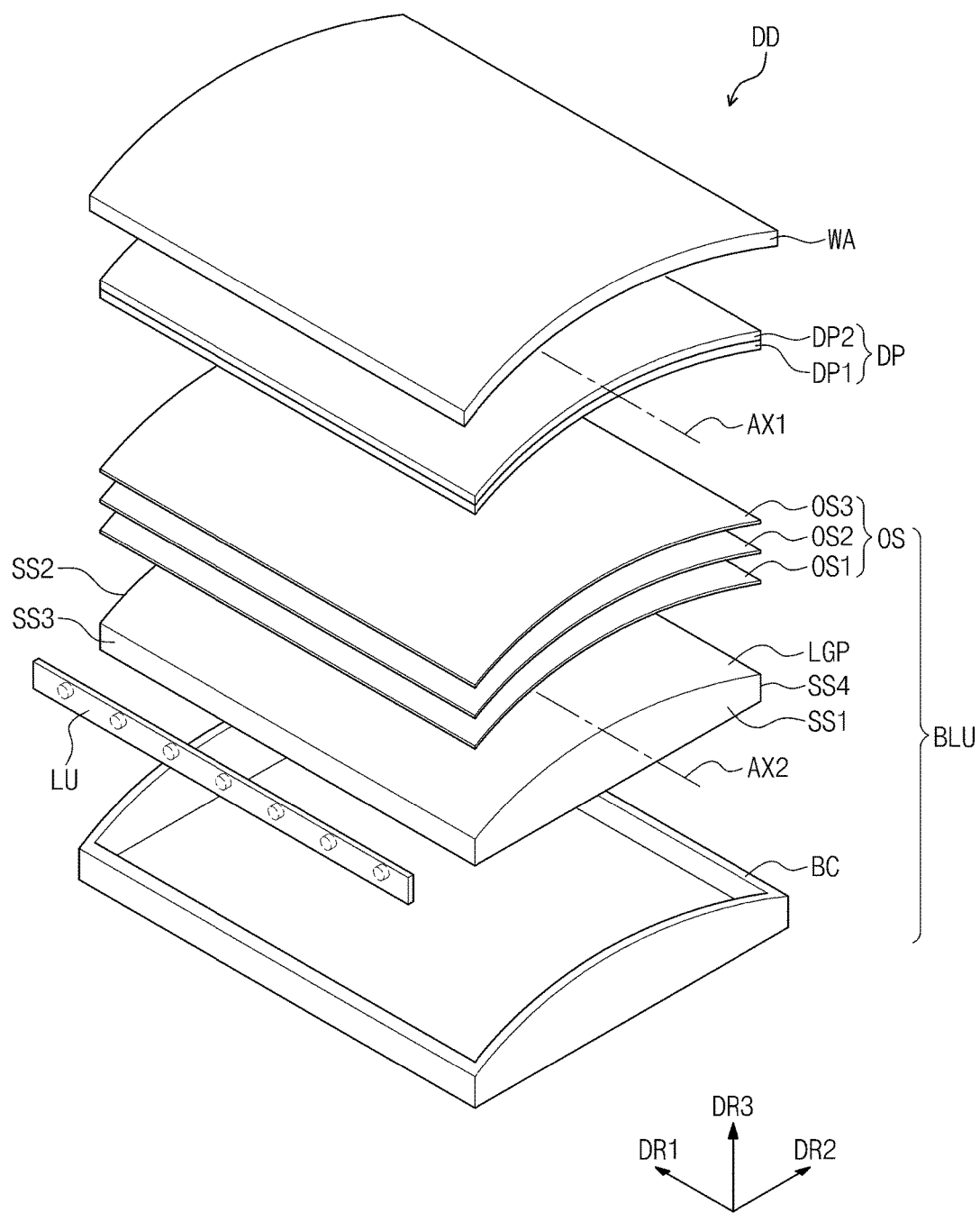
FIG. 2 is an exploded perspective view showing a display device according to an exemplary embodiment of the disclosure.
Figure 3:
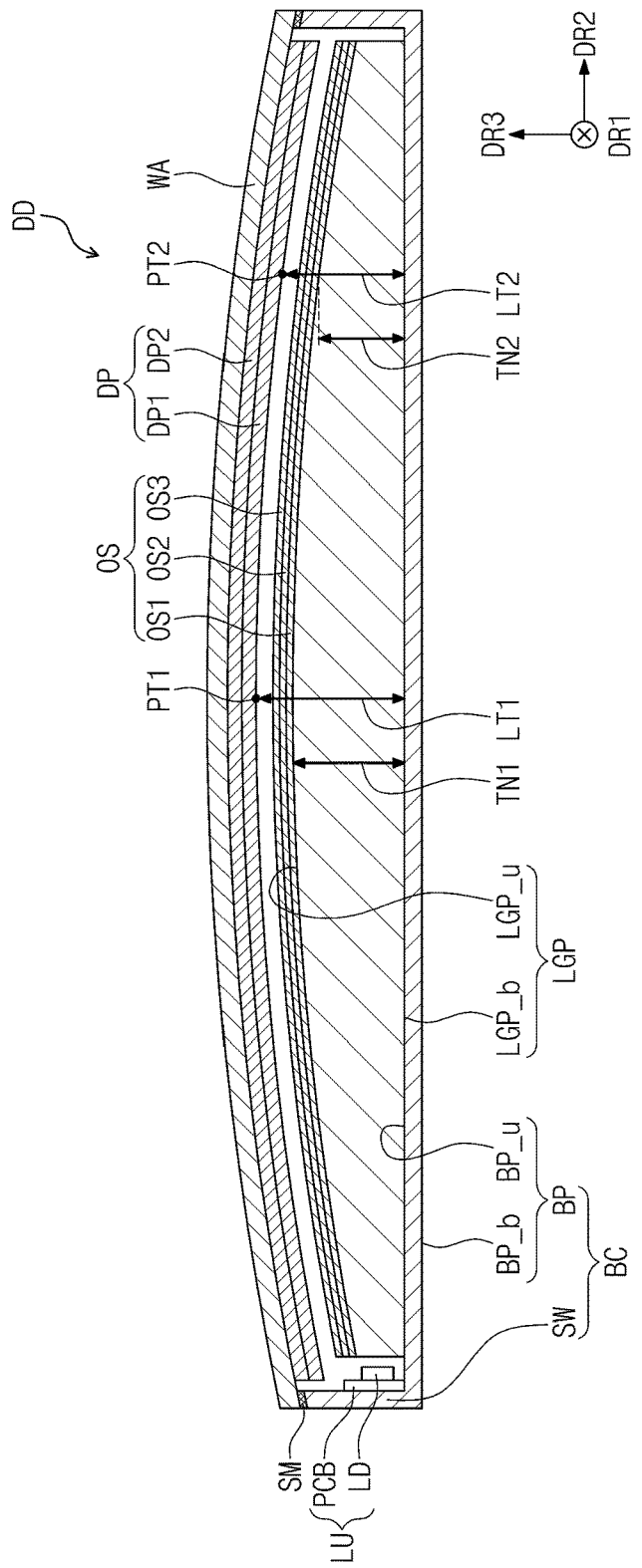
FIG. 3 is a cross-sectional view showing a display device according to an exemplary embodiment of the disclosure.

FIG. 2 is an exploded perspective view showing a display device DD according to an exemplary embodiment of the disclosure, and FIG. 3 is a cross-sectional view showing a display device DD according to an exemplary embodiment of the disclosure.

Referring to FIGS. 2 and 3, an exemplary embodiment of the display device DD includes a window member WA, a display panel DP, and a backlight unit BLU.

The window member WA includes a silicon substrate, a glass substrate, a sapphire substrate or a plastic film, but not being limited thereto or thereby. The window member WA may further include a functional coating layer disposed on an entire surface thereof. The functional coating layer includes an anti-fingerprint layer, an anti-reflection layer or a hard coating layer.

The window member WA is coupled to the display panel DP. The display panel DP and the window member WA may be coupled to each other by an adhesive member (not shown). In an exemplary embodiment, the adhesive member includes an optically clear adhesive film, but not being limited thereto or thereby. In an alternative exemplary embodiment, the adhesive member may be an optical clear resin.

Although not shown in figures, a touch sensing unit may further disposed between the window member WA and the display panel DP. The touch sensing unit obtains coordinate information of an input position. The touch sensing unit is classified into a resistive film type of touch sensing unit, an electrostatic capacitive type of touch sensing unit and an electromagnetic induction type of touch sensing unit. In an exemplary embodiment, the touch sensing unit may be, but not limited to, the electrostatic capacitive type touch sensing unit. In such an embodiment, the touch sensing unit includes two kinds of sensors cross each other. The electrostatic capacitive type touch sensing unit obtains the coordinate information of the touch position using a self-capacitance manner or a mutual capacitance manner.

In an exemplary embodiment, the display panel DP may include a first substrate DP1, a second substrate DP2 facing the first substrate DP1, and a liquid crystal layer (not shown) disposed between the first and second substrates DP1 and DP2. The liquid crystal layer includes liquid crystal molecules of which an arrangement is changed in accordance with an electric field generated between the first and second substrates DP1 and DP2. In such an embodiment, polarizing plates (not shown) may be respectively disposed on and under the display panel DP or outer surfaces of the display panel DP.

The display panel DP is curved with respect to a plane defined by the first and second directions DR1 and DR2 with reference to or about a first reference axis AX1 substantially parallel to the first direction DR1. The window member WA may be curved along the second direction DR2 or about the first direction DR1.

The backlight unit BLU may include a light guide plate LGP, a light source unit LU, optical sheets OS and a bottom chassis BC.

The light guide plate LGP is disposed under the display panel DP. In an exemplary embodiment, as shown in FIGS. 2 and 3, the light guide plate LGP includes a first surface LGP_u, a second surface LGP_b, a first side surface SS1, a second side surface SS2, a third side surface SS3 and a fourth side surface SS4.

The first surface LGP_u faces the display panel DP. The second surface LGP_b faces the first surface LGP_u, and the second surface LGP_b faces the display panel DP such that the first surface LGP_u is disposed between the second surface LGP_b and the display panel DP.

The first surface LGP_u has a curved surface having a shape corresponding to the curved shape of the display panel DP. The first surface LGP_u is curved about a second reference axis AX2 substantially parallel to the first direction DR1 and along the second direction DR2. Accordingly, the first surface LGP_u is curved with respect to the plane defined by the first and second directions DR1 and DR2.

In such an embodiment, where the first surface LGP_u, from which the light is emitted has the curved shape similar to that of the display panel DP, a distance between the display panel DP and the light guide plate LGP is substantially constant.

In an exemplary embodiment, the display panel DP has a first radius of curvature, and the first surface LGP_u has a second radius of curvature. Here, the first radius of curvature of the display panel DP indicates a radius of curvature of a lower surface of the first substrate DP1. In an exemplary embodiment, the first radius of curvature may be substantially the same as the second radius of curvature. In such an embodiment where the first radius of curvature is equal to the second radius of curvature and the first surface LGP_u moves to a third direction DR3 perpendicular to the first and second direction DR1 and DR2, the first surface LGP_u overlaps the lower surface of the first substrate DP1 when viewed in a plan view in the third direction DR3. Therefore, a distance in the third direction DR3 between the display panel DP and the first surface LGP_u may be substantially constant. In such an embodiment, where the distance in the third direction DR3 between the display panel DP and the first surface LGP_u is substantially constant, the display panel DP receives the light having uniform brightness from the light guide plate LGP.

In an alternative exemplary embodiment, the display panel DP and the first surface LGP_u may have different radius of curvatures. In such an embodiment, after the display device DD is assembled, a center of the curvature of the radius of curvature of the display panel DP may overlap a center of the curvature of the radius of curvature of the first surface LGP_u. In one exemplary embodiment, for example, the first surface LGP_u has the radius of curvature of about 990 millimeters (mm), the display panel DP has the radius of curvature of about 1000 mm, and the first surface LGP_u is spaced from the display panel DP by about 10 mm. The radius of curvatures may not be limited to the above-mentioned values.

The second surface LGP_b is substantially parallel to the plane defined by the first and second directions DR1 and DR2. The second surface LGP_b includes an optical pattern LP (refer to FIG. 4) to reflect, scatter and refract the light provided thereto. In such an embodiment, the second surface LGP_b is flat, such that the optical pattern LP (refer to FIG. 4) may be easily provided on the second surface LGP_b, which will be described in detail with reference to FIG. 3.

Hereinafter, a distance between the display panel DP and the second surface LGP_b of the light guide plate LGP at a center of the display panel DP is referred to as a first distance LT1, and a distance between the display panel DP and the second surface LGP_b of the light guide plate LGP at a second position PT2 is referred to as a second distance LT2. When viewed in the third direction DR3, the second position PT2 is spaced apart from the first position PT1 in the second direction DR2. In an exemplary embodiment, the first distance LT1 is greater than the second distance LT2. Thus, a viewer or user sees the image displayed on the display screen in which the center of the display panel DP is convex.

When viewed in the third direction DR3, a first thickness TN1 of a portion of the light guide plate LGP overlapping the first position PT1 may be greater than a second thickness TN2 of a portion of the light guide plate LGP overlapping the second position PT2 when viewed in the third direction DR3. In an exemplary embodiment, where the display panel DP is convexly curved with respect to the second surface LGP_b, the first surface LGP_u may be convexly curved with respect to the second surface LGP_b.

Each of the first, second, third and fourth side surfaces SS1, SS2, SS3 and SS4 connects the first surface LGP_u and the second surface LGP_b. The first and second side surfaces SS1 and SS2 are spaced apart from each other in the first direction DR1 and face each other. Each of the first and second side surfaces SS1 and SS2 is substantially parallel to a plane defined by the second and third directions DR2 and DR3. The third and fourth side surfaces SS3 and SS4 are spaced apart from each other in the second direction DR2 and face each other. Each of the third and fourth side surfaces SS3 and SS4 is substantially parallel to a plane defined by the first and third directions DR1 and DR3.

In an exemplary, where the first surface LGP_u of the light guide plate LGP is curved along the second direction DR2, a width in the third direction DR3 of each of the first and second side surfaces SS1 and SS2 is not constant. The width in the third direction DR3 of each of the first and second side surfaces SS1 and SS2 is changed to correspond to a distance between the second surface LGP_b that is flat and the first surface LGP_u that is curved.

In an exemplary embodiment, a width in the third direction DR3 of the first side surface SS1 decreases as a distance in the second direction DR2 from a center of the first side surface SS1 increases and a distance from ends of the first side surface SS1 in the second direction DR2 decreases. One end of the first side surface SS1 in the second direction DR2 is connected to the third side surface SS3, and the other end of the first side surface SS1 in the second direction DR2 is connected to the fourth side surface SS4. A width in the third direction DR3 of the second side surface SS2 decreases as a distance in the second direction DR2 from the center of the second side surface SS2 increases and a distance from ends of the second side surface SS2 in the second direction DR2 decreases. One end of the second side surface SS2 in the second direction DR2 is connected to the third side surface SS3, and the other end of the second side surface SS2 in the second direction DR2 is connected to the fourth side surface SS4.

Each of the third and fourth side surfaces SS3 and SS4 has a substantially rectangular shape. Accordingly, a width in the third direction DR3 of each of the third and fourth side surfaces SS3 and SS4 may be constant.

The light source unit LU is disposed along a side surface of the light guide plate LGP. The light source unit LU may be disposed to face at least one of the third and fourth side surfaces SS3 and SS4. FIG. 2 shows an exemplary embodiment where the light source unit LU is disposed to face the third side surface SS3, but not being limited thereto or thereby. In an alternative exemplary embodiment, the light source unit LU may be provided in a plural number, and the light source units LU may be disposed to face the third and fourth side surfaces SS3 and SS4.

The light source unit LU includes a light source LS and a printed circuit board PCB. The light source LS is disposed or mounted on the printed circuit board PCB, and receives a driving voltage from the printed circuit board PCB. The light source LS provides the light to the light guide plate LGP in response to the driving voltage.

The optical sheets OS are disposed between the light guide plate LGP and the display panel DP. The optical sheets OS are curved corresponding to the curvature of the first surface LGP_u of the light guide plate LGP. The optical sheets OS control a path of the light guided by the light guide plate LGP.

The optical sheets OS include a diffusion sheet OS1, a prism sheet OS2 and a protective sheet OS3. The diffusion sheet OS1 diffuses the light, and the prism sheet OS2 condenses the light such that the light diffused by the diffusion sheet OS1 travels in a direction closer to a normal line direction of the display panel DP. The protective sheet OS3 protects the prism sheet OS2 from external impacts. In an exemplary embodiment, at least one of the diffusion sheet OS1, the prism sheet OS2 and the protective sheet OS3 may be provided in a plural number, or at least one of the diffusion sheet OS1, the prism sheet OS2 and the protective sheet OS3 may be omitted from the optical sheets OS.

The bottom chassis BC includes a bottom portion BP and a sidewall portion SW. The bottom portion BP is disposed under the light guide plate LGP. In an exemplary embodiment, the sidewall portion SW is bent from the bottom portion BP and extends in the third direction DR3. In an alternative exemplary, the sidewall portion SW may extend from the bottom portion BP after being bent from the bottom portion BP at a predetermined angle.

The adhesive member SM is disposed on the sidewall portion SW or between the sidewall portion SW and the window member WA. The sidewall portion SW and the window member WA are coupled to each other by the adhesive member SM. The printed circuit board PCB may be attached to an inner surface of the sidewall portion SW by an adhesive, e.g., a double-sided tape.

The bottom portion BP includes a first bottom surface BP_u and a second bottom surface BP_b. The first bottom surface BP_u faces the second bottom surface BP_b. The first bottom surface BP_u is disposed between the second bottom surface BP_b and the light guide plate LGP.

The first bottom surface BP_u is substantially parallel to the plane defined by the first and second directions DR1 and DR2. The light guide plate LGP is disposed on the first bottom surface BP_u that is flat. In an exemplary embodiment, where the second surface LGP_b of the light guide plate LGP is flat, the light guide plate LGP may be easily placed on the first bottom surface BP_u.

In a case where a flat light guide plate (not shown) is placed on a curved bottom surface (not shown) and pressurized to the curved bottom surface such that the flat light guide plate is curved, a weight is applied to a bottom chassis (not shown). In such a case, the curvature of the bottom surface of the bottom chassis is difficult to be maintained while the weight is applied to the bottom chassis, and also, the curvature of the bottom surface of the bottom chassis is not maintained due to a repulsive force of the curved light guide plate after the backlight unit is assembled. Accordingly, in such a case, the backlight unit continuously applied with stress may be twisted after being assembled. In an exemplary embodiment, the light guide plate LGP having the flat second surface LGP_b is disposed on the bottom chassis BC having the flat first bottom surface BP_u. In such an embodiment, since the first surface LGP_u, from which the light exits, has the curved shape, the process of bending the light guide plate LGP is omitted, and thus the backlight unit BLU may be easily assembled. In such an embodiment, the stress caused by the light guide plate LGP may not be generated on the bottom chassis BC. Therefore, the backlight unit BLU may be effectively prevented from being deformed, and a manufacturing yield and a reliability of products may be improved.

In an exemplary embodiment, although not shown in FIGS. 2 and 3, a reflective sheet (not shown) may be further disposed between the light guide plate LGP and the bottom chassis BC. The reflective sheet reflects the light leaking from the light guide plate LGP to allow the leaked light to be incident to the light guide plate LGP again. In an alternative exemplary embodiment, a light reflective material may be coated on the bottom chassis BC, and the reflective sheet may be omitted.

Figure 4:
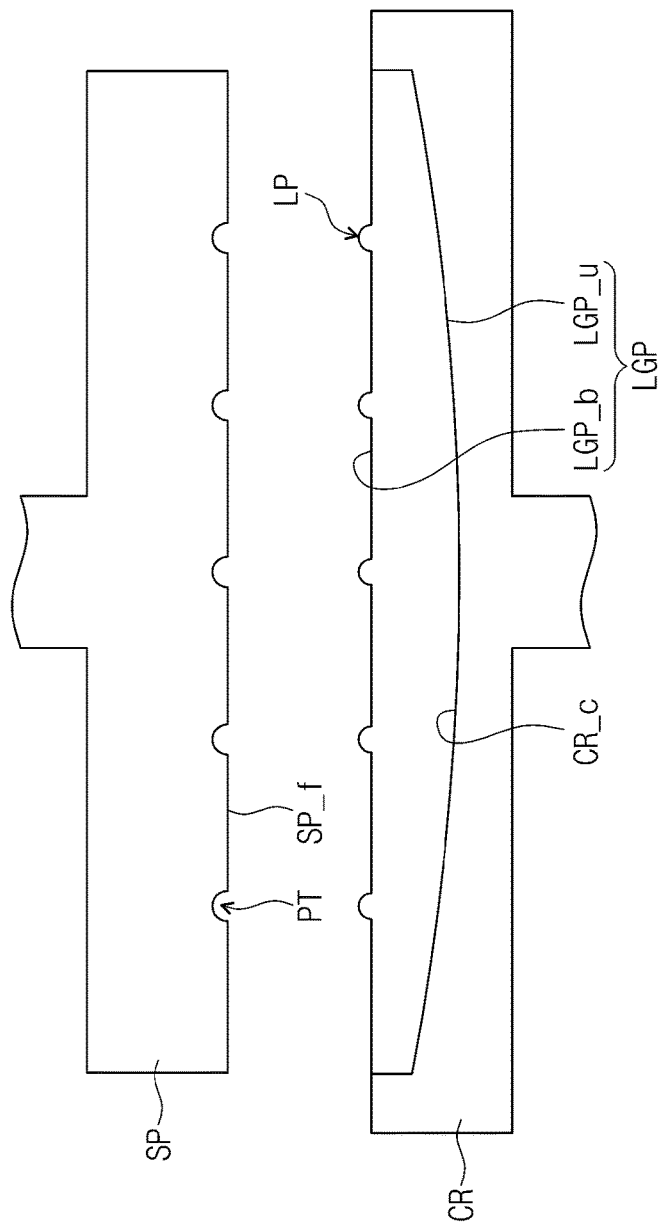
FIG. 4 is a cross-sectional view showing a mold used to manufacture a light guide plate according to an exemplary embodiment of the disclosure.

FIG. 4 is a cross-sectional view showing a mold CR used to manufacture a light guide plate according to an exemplary embodiment of the disclosure.

Referring to FIGS. 3 and 4, the mold CR and a stamper SP are used to form the light guide plate LGP, but the method of forming the light guide plate LGP may not be limited to the method shown in FIG. 4. The method of forming the optical pattern LP may not be limited to the method performed by the stamper SP shown in FIG. 4.

In an exemplary embodiment, the mold CR includes a curvature portion CR_c having a curvature. The stamper SP includes a flat portion SP_f that is flat. The first surface LGP_u of the light guide plate LGP is formed by the curvature portion CR_c, and the second surface LGP_b of the light guide plate LGP is formed by the flat portion SP_f.

The flat portion SP_f includes a pattern PT defined therein. The stamper SP pressurizes the second surface LGP_b of the light guide plate LGP to form the optical pattern LP on the second surface LGP_b. In an exemplary embodiment, as shown in FIG. 4, the pattern PT is formed in an intaglio shape on the flat portion SP_f, but not being limed thereto. In an alternative exemplary embodiment, the flat portion SP_f may be provided in an embossed shape.

According to an exemplary embodiment, since the pattern is formed in the flat portion SP_f, the pattern may be more easily formed. In a case where the pattern is formed on a curved stamper (not shown) using a laser beam, an output intensity of the laser beam is controlled every position to which the laser beam is irradiated. Accordingly, in such a case, when the pattern is formed on the curved stamper, the number of the factors to be considered, e.g., output intensity of the laser beam, direction of the laser beam, etc., increase. In an the exemplary embodiment, since the second surface LGP_b of the light guide plate LGP is flat, the stamper SP used to form the optical pattern LP on the second surface LGP_b may have the flat surface. Therefore, the pattern may be more easily formed on the flat portion SP_f of the stamper SP than when the pattern is formed on the curved stamper.

When the mold CR is filled with a material for the light guide plate LGP, the material filled in the mold CR is pressurized by the stamper SP. As a result, the light guide plate LGP, on which the optical pattern LP is formed, is manufactured. In an exemplary embodiment, as shown in FIG. 4, the optical pattern LP has a constant size and is arranged in uniform density, but not being limited thereto. In an alternative exemplary embodiment, the size and density of the optical pattern LP may be irregular.

In an exemplary embodiment, the pattern PT and the optical pattern LP have a convex hemispherical shape as shown in FIG. 4, but not being limited thereto or thereby. In alternative exemplary embodiments, the pattern PT and the optical pattern LP may have various shapes, e.g., a conical shape, a polygonal pyramid shape, a prism shape, a shape obtained by combining a plurality of straight scratches, a shape obtained by combining a plurality of zigzag scratches, etc.

Figure 5:
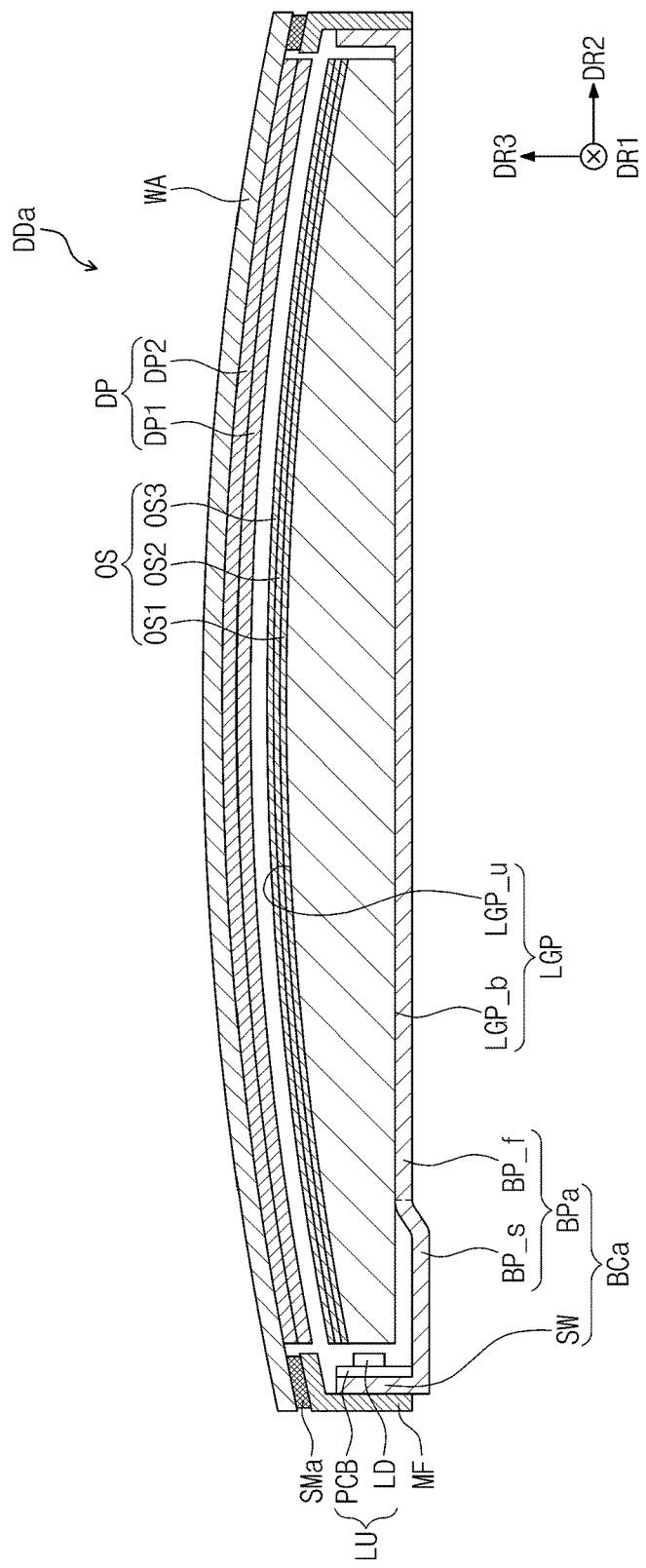
FIG. 5 is a cross-sectional view showing a display device according to an alternative exemplary embodiment of the disclosure.

FIG. 5 is a cross-sectional view showing a display device DDa according to an alternative exemplary embodiment of the disclosure.

The display device DDa shown in FIG. 5 has the same structure and function as those of the display device DD described with reference to FIG. 3 except for a bottom chassis BCa. Hereinafter, different features of the display device DDa from those of the display device DD shown in FIG. 3 will be mainly described.

In an exemplary embodiment, as shown in FIG. 5, a bottom portion BPa of the bottom chassis BCa has a step shape. The bottom portion BPa includes a flat portion BP_f substantially parallel to the second surface LGP_b of the light guide plate LGP and a step portion BP_s extending from the flat portion BP_f and disposed under the light source unit LU. Due to the step portion BP_s, a space in which the light source unit LU is accommodated is obtained, and the thickness of the display device DDa is reduced. Although not shown in FIG. 5, a light blocking member (not shown) may be disposed between the step portion BP_s and the light guide plate LGP to block the light.

A mold frame MF may be disposed along an edge of the sidewall portion SW of the bottom chassis BCa. The mold frame MF covers the sidewall portion SW of the bottom chassis BCa and is disposed along the edge of the bottom chassis BCa. An adhesive member SMa may be disposed on the mold frame MF. The window member WA and the mold frame MF may be coupled to each other by the adhesive member SMa.

Figure 6:
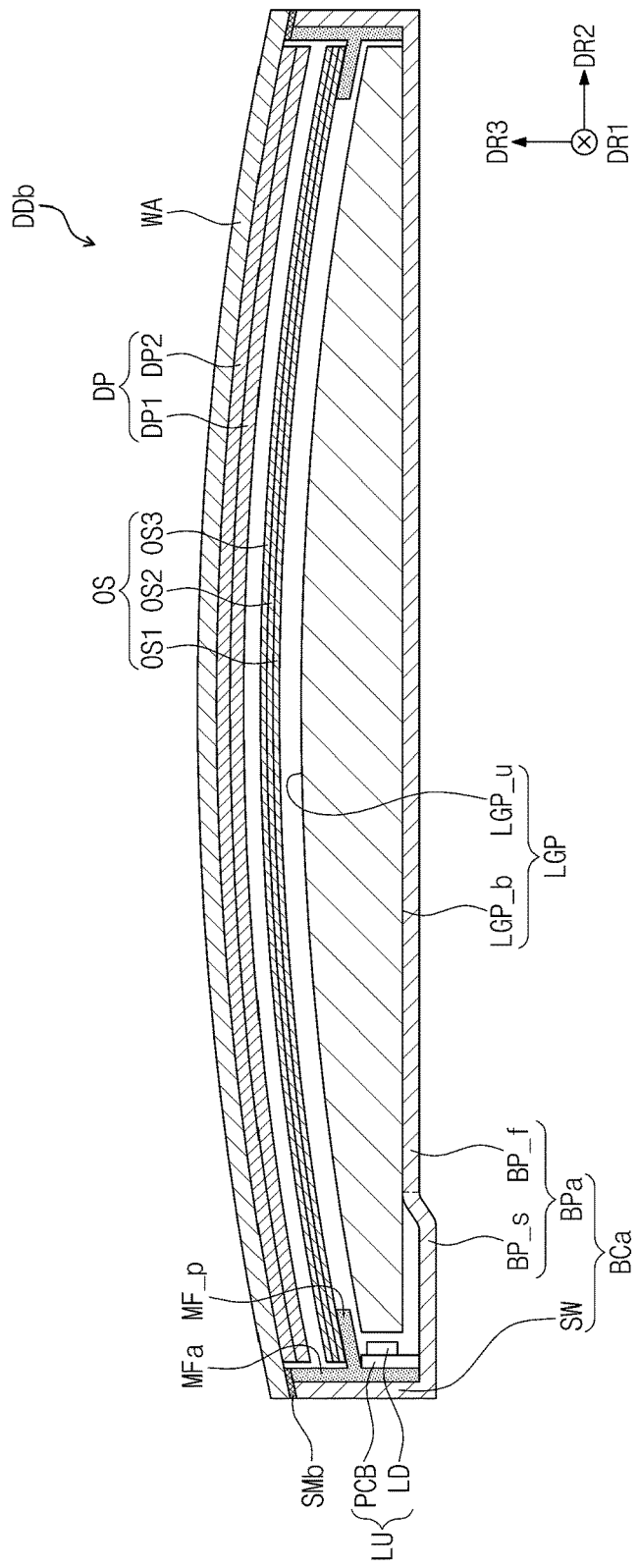
FIG. 6 is a cross-sectional view showing a display device according to an alternative exemplary embodiment of the disclosure.

FIG. 6 is a cross-sectional view showing a display device DDb according to another alternative exemplary embodiment of the disclosure.

The display device DDb shown in FIG. 6 has the same structure and function as those of the display device DDa described with reference with FIG. 5 except for a mold frame MFa.

In an exemplary embodiment, as shown in FIG. 6, the mold frame MFa is accommodated in the bottom chassis BCa along the sidewall SW of the bottom chassis BCa. The mold frame MFa has the substantially same height as that of the sidewall portion SW of the bottom chassis BCa.

A protrusion portion MF_p may be disposed on an inner sidewall of the mold frame MFa to support the optical sheets OS or the display panel DP. In an exemplary embodiment, as shown in FIG. 6, the protrusion portion MF_p supports the optical sheets OS.

In such an embodiment, an adhesive member SMb may be disposed between the sidewall SW and the window member WA and between the mold frame MF and the window member WA. The window member WA may be coupled to the sidewall portion SW and the mold frame MF.

Figure 7:
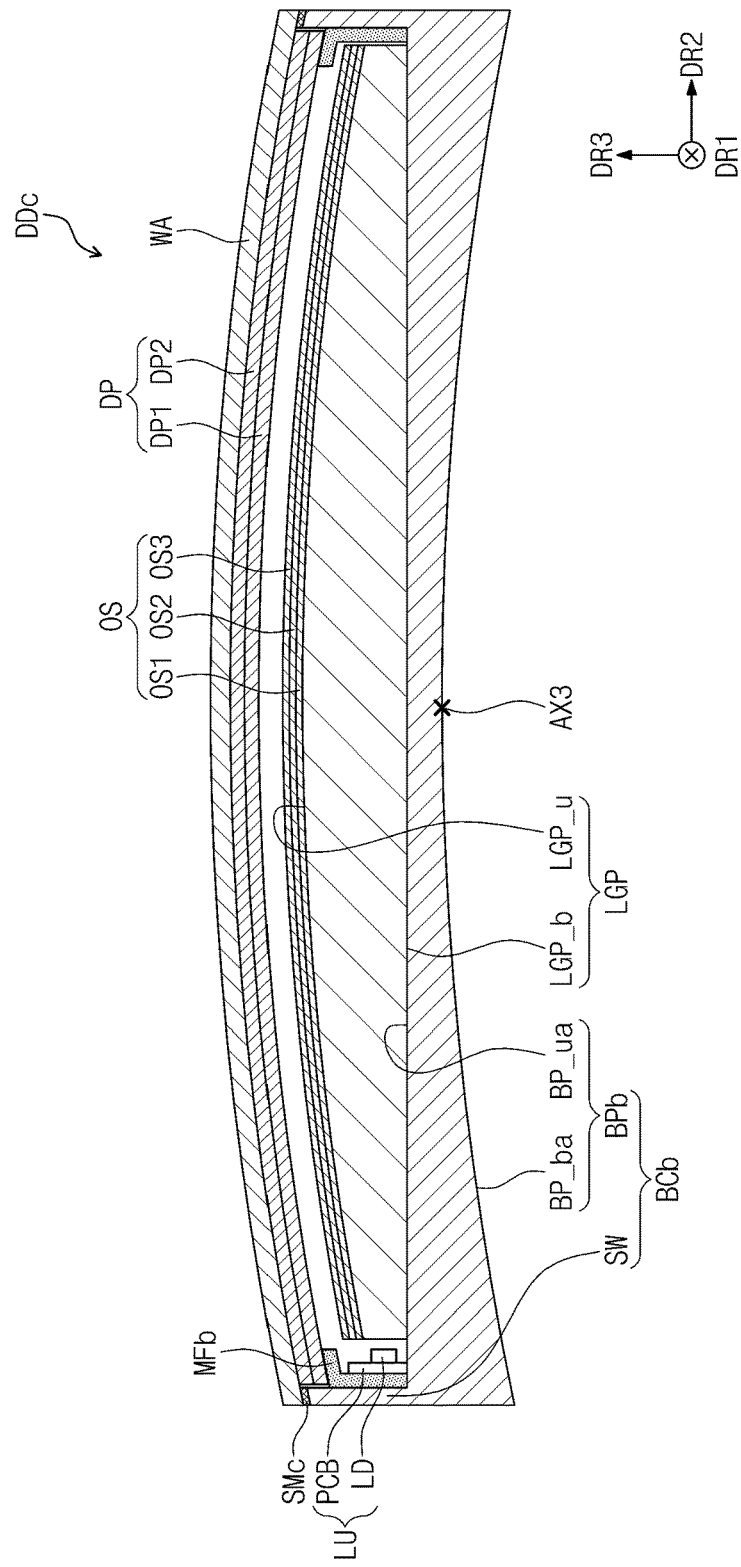
FIG. 7 is a cross-sectional view showing a display device according to an alternative exemplary embodiment of the disclosure.

FIG. 7 is a cross-sectional view showing a display device DDc according to another alternative exemplary embodiment of the disclosure.

The display device DDc shown in FIG. 7 has the same structure and function as those of the display device DD described with reference to FIG. 3 except for a bottom chassis BCb. Hereinafter, different features of the display device DDc from those of the display device DD will be mainly described.

In an exemplary embodiment, the bottom chassis BCb includes a bottom portion BPb including a first bottom surface BP_ua and a second bottom surface BP_ba. The first bottom surface GP_ua and the second bottom surface BP_ba face each other. The first bottom surface GP_ua is disposed between the second bottom surface BP_ba and the light guide plate LGP.

The first bottom surface BP_ua is substantially parallel to a plane defined by the first and second directions DR1 and DR2. The light guide plate LGP may be easily disposed on or supported by the flat first bottom surface BP_ua.

The second bottom surface BP_ba is curved about a reference axis AX3 substantially parallel to the first direction DR1, but not being limited thereto or thereby. In one exemplary embodiment, for example, the first bottom surface have the same shape as those in the exemplary embodiments described above with reference to FIGS. 3 and 5, but the second bottom surface BP_ba may have a different shape from that of the first bottom surface BP_ua.

The second bottom surface BP_ba may have a shape corresponding to a shape of a structure to which the display device DDc is installed. In one exemplary embodiment, for example, the display device DDc may be installed to the structure with a curved shape. In an exemplary embodiment, protrusions may be disposed or formed on the second bottom surface BP_ba, and thus the second bottom surface BP_ba may be coupled to a structure in which accommodating recesses are formed to accommodate the protrusions. The shape of the second bottom surface BP_ba may be changed depending on conditions of a particular place at which the display device DDc is installed.

The display device DDc may further include a mold frame MFb supporting the display panel DP. The mold frame MFb may be disposed along the sidewall portion SW of the bottom chassis BCb. In an exemplary embodiment, as shown in FIG. 7, the mold frame MFb may be disposed under a non-display area (not shown) of the display panel DP and supports the display panel DP.

Figure 8:
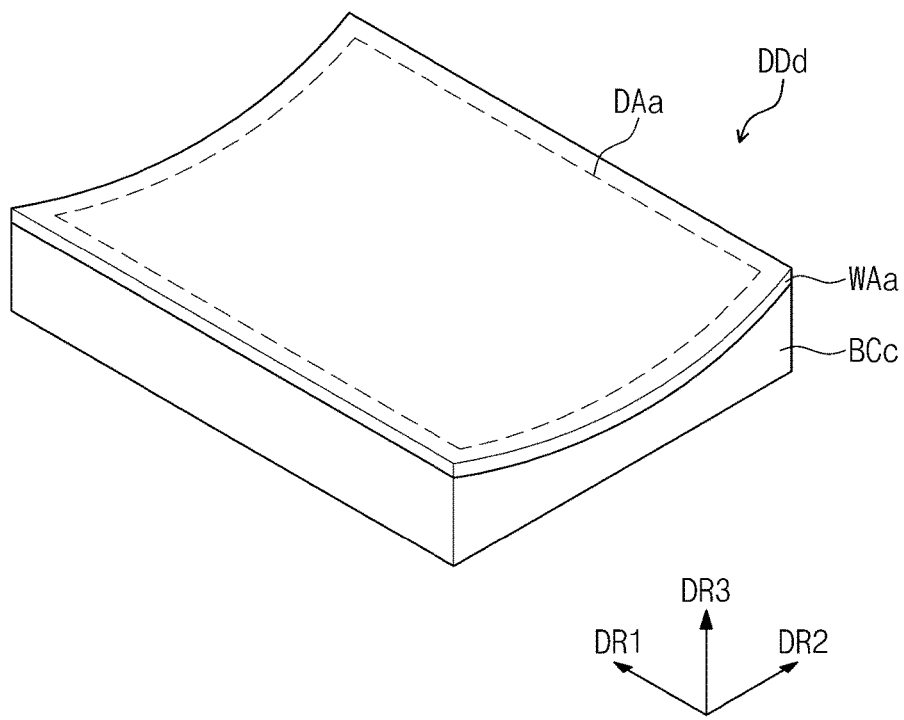
FIG. 8 is a cross-sectional view showing a display device according to an alternative exemplary embodiment of the disclosure.
Figure 9:
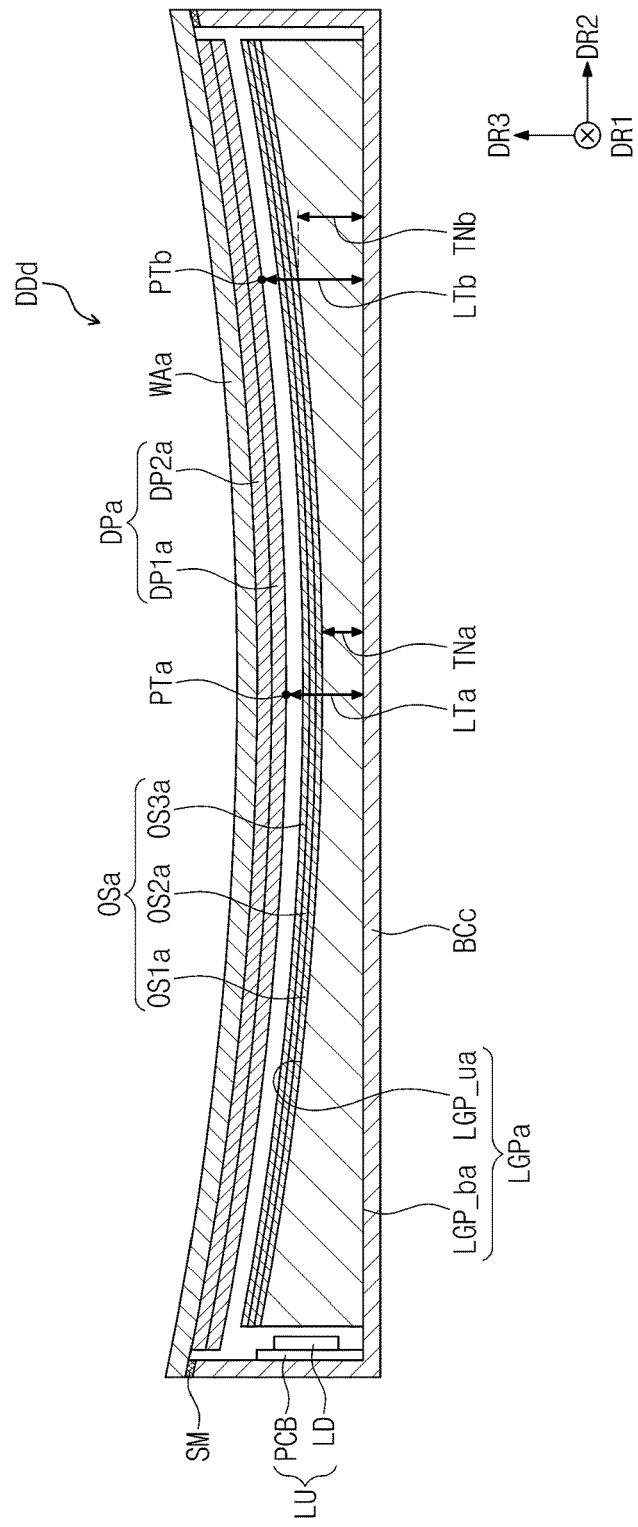
FIG. 9 is a cross-sectional view showing a display device according to an alternative exemplary embodiment of the disclosure.

FIG. 8 is a cross-sectional view showing a display device DDd according to an alternative exemplary embodiment of the disclosure, and FIG. 9 is a cross-sectional view showing the display device DDd according to an alternative exemplary embodiment of the disclosure.

Referring to FIGS. 8 and 9, an exemplary embodiment of the display device DDd displays the image through a curved display surface DAa. The display surface DAa is curved in the second direction DR2 with respect to the plane defined by the first direction DR1 and the second direction DR2. In an exemplary embodiment, as shown in FIG. 8, the display surface DAa may be concavely curved. In such an embodiment, each of a window member WAa, a display panel DPa including a first substrate DP1a and a second substrate DP2a facing the first substrate DP1a, and optical sheets OSa including a diffusion sheet OS1a, a prism sheet OS2a and a protective sheet OS3a may be concavely curved.

The light guide plate LGPa is disposed under the display panel DPa. The light guide plate LGPa includes a first surface LGP_ua and a second surface LGP_ba. The first surface LGP_ua faces the display panel DPa, and the second surface LGP_ba faces the display panel DPa such that the first surface LGP_ua is disposed between the second surface LGP_ba and the display panel DPa. The first surface LGP_ua has a curved shape corresponding to the curved shape of the display panel DPa. The first surface LGP_ua is curved about a reference axis substantially parallel to the first direction DR1 and along the second direction DR2. Accordingly, the first surface LGP_ua is curved with respect to the plane defined by the first and second directions DR1 and DR2.

In such an embodiment, where the first surface LGP_ua of the light guide plate LGP, from which the light is emitted, has the curved shape similar to that of the display panel DPa, a distance between the display panel DPa and the light guide plate LGPa is substantially constant. In such an embodiment, where the distance between the display panel DPa and the light guide plate LGPa is substantially constant, the display panel DPa receives the light having uniform brightness from the light guide plate LGPa.

The second surface LGP_ba is substantially parallel to the plane defined by the first and second directions DR1 and DR2. An optical pattern is disposed on the second surface LGP_ba to reflect or scatter the light traveling thereto. In such an embodiment, where the second surface LGP_ba is flat, the bottom portion of the bottom chassis BCc, on which the light guide plate LGP is placed, has the flat shape, and thus the light guide plate LGP and the bottom chassis BCc may be more easily coupled to each other.

In an exemplary embodiment, a distance between the display panel DPa and the second surface LGP_ba of the light guide plate LGP at a first position PTa in a center of the display panel DPa is referred to as a first distance LTa, and a distance between the display panel DPa and the second surface LGP_ba at a second position PTb of the display panel DP is referred to as a second distance LTb. When viewed in the third direction DR3, the second position PTb is spaced apart from the first position PTa in the second direction DR2. In an exemplary embodiment, the first distance LTa may be smaller than the second distance LTb. Thus, a viewer or a user sees the image displayed on the display screen in which the center of the display panel DP is concave.

When viewed in the third direction DR3, a first thickness TNa of a portion of the light guide plate LGPa overlapping the first position PTa may be smaller than a second thickness TNb of a portion of the light guide plate LGP overlapping the second position PTb when viewed in the third direction DR3. In an exemplary embodiment, where the display panel DPa is concavely curved with respect to the second surface LGP_ba, the first surface LGP_ua may be concavely curved with respect to the second surface LGP_ba.

Figure 10:
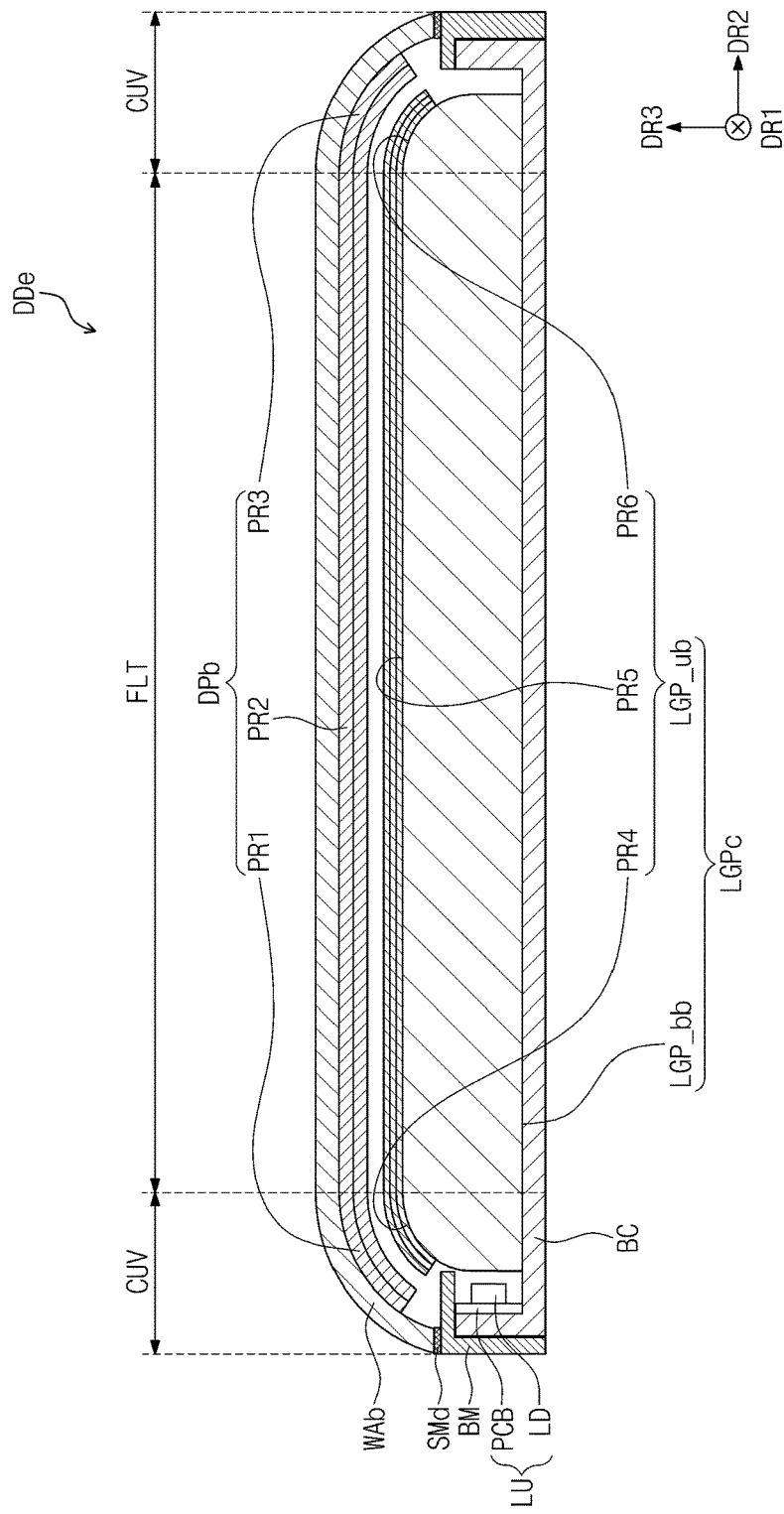
FIG. 10 is a cross-sectional view showing a display device according to an alternative exemplary embodiment of the disclosure.

FIG. 10 is a cross-sectional view showing a display device DDe according to another alternative exemplary embodiment of the disclosure.

Referring to FIG. 10, an exemplary embodiment of the display device DDe has a shape in which only areas respectively adjacent to corner portions or side portions extending in the first direction DR1 are curved. The display device DDe includes a curved area CUV, a flat area FLT, and a curved area CUV, which are sequentially arranged in the second direction DR2 crossing the first direction DR1.

A display panel DPb includes a first portion PR1 curved with respect to the second direction DR2, a second portion PR2 that is flat, and a third portion PR3 curved with respect to the second direction DR2. The second portion PR2 is defined between the first portion PR1 and the third portion PR3. The second portion PR2 is substantially parallel to the plane defined by the first and second directions DR1 and DR2.

When viewed in the third direction DR3, the first portion PR1 overlaps the curved area CUV, the second portion PR2 overlaps a flat area FLT, and the third portion PR3 overlaps the curved area CUV.

A light guide plate LGPc is disposed under the display panel DPb. The light guide plate LGPc includes a first surface LGP_ub and a second surface LGP_bb. The first surface LGP_ub faces the display panel DPb, and the second surface LGP_bb faces the display panel DPb such that the first surface LGP_ub is disposed between the second surface LGP_bb and the display panel DPb. The first surface LGP_ub has a curved shape corresponding to the curved shape of the display panel DPb.

The first surface LGP_ub includes a portion (hereinafter, a first portion PR4) curved with respect to the second direction DR2, a portion (hereinafter, a second portion PR5) that is flat, and a portion (hereinafter, a third portion PR6) curved with respect to the second direction DR2. The second portion PR5 is defined between the first portion PR4 and the third portion PR6.

When viewed in the third direction DR3, the first portion PR4 overlaps the first portion PR1, the second portion PR5 overlaps the second portion PR2, and the third portion PR6 overlaps the third portion PR3. The first and first portions PR1 and PR4 are curved at the same radius of curvature as each other, and the third and third portions PR3 and PR6 are curved at the same radius of curvature as each other. In such an embodiment, the distance between the display panel DPb and the first surface LGP_ub is substantially constant, such that the display panel DPb receives the light having substantially uniform brightness from the light guide plate LGP.

In an alternative exemplary embodiment, one portion of the first and third portions PR1 and PR3 of the display panel DPb may be curved, and the other portion of the first and third portions PR1 and PR3 of the display panel DPb may be flat. In such an embodiment, one portion of the first and third portions PR4 and PR6 of the first surface LGP_ub of the light guide plate LGPb may be curved corresponding to the shape of the display panel DPb, and the other portion of the first and third portions PR4 and PR6 of the first surface LGP_ub of the light guide plate LGPb may be flat. In such an embodiment, the curved portion of the display panel DPb and the curved portion of the light guide plate LGPb may overlap each other when viewed in the third direction DR3.

The mold frame BM is disposed along an edge of the sidewall portion SW of the bottom chassis BC. In an exemplary embodiment, the mold frame BM covers an upper portion of a light source LD. Accordingly, a hot spot may be effectively prevented from occurring in an area neighboring to the light incident portion. The mold frame BM does not transmit the light. In one exemplary embodiment, for example, a light reflective material is coated on an area of the mold frame BM, which faces the light source LD, or a light absorbing material is coated on the area of the mold frame BM, which faces the light source LD. In an alternative exemplary embodiment, the mold frame BM may include or be formed of a material that does not transmit the light.

Figure 11:
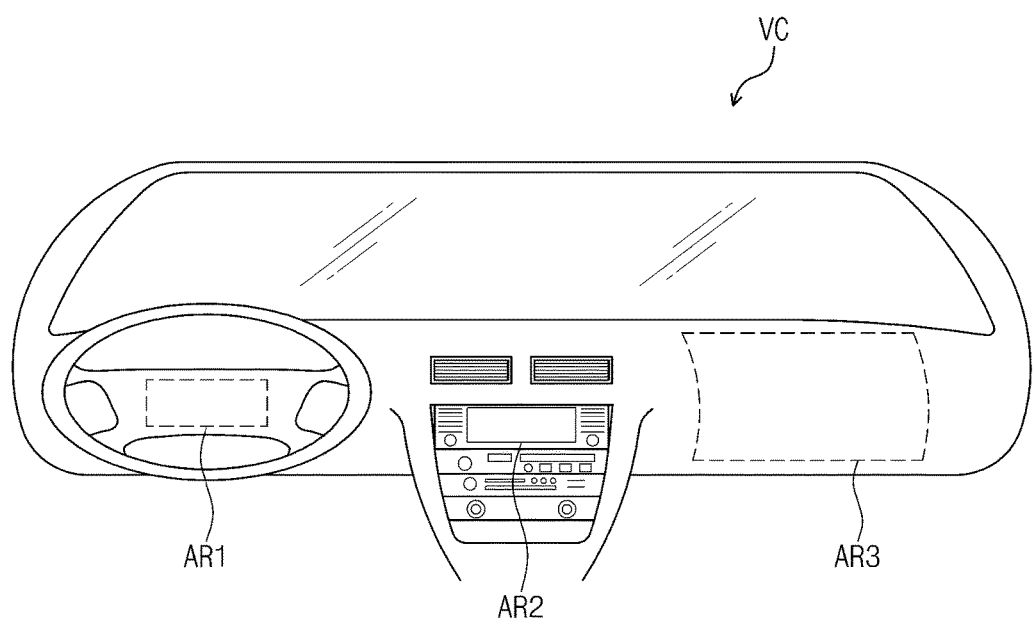
FIG. 11 is a view showing an apparatus, to which a display device according to an exemplary embodiment of the disclosure is applied.

FIG. 11 is a view showing an apparatus to which a display device according to an exemplary embodiment of the disclosure is applied.

Referring to FIG. 11, an exemplary embodiment of the display devices DDa, DDb, DDc, DDd or DDe described above may be installed inside a vehicle VC. Such an embodiment of the display device DDa, DDb, DDc, DDd, or DDe may be installed at a center area AR1 of a steering wheel, an operation area AR2 between a driver seat and a passenger seat or a dash board AR3 facing the passenger seat. FIG. 11 shows a representative example to which an exemplary embodiment of the display devices DDa, DDb, DDc, DDd or DDe is applied.

Although some exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a display panel having a curved shape;
   a light guide plate disposed under the display panel;
   a light source which provides a light to the light guide plate; and
   a bottom chassis disposed under the light guide plate, wherein the light guide plate comprises: an upper surface having a curved shape corresponding to the curved shape of the display panel; and a lower surface facing the upper surface and having a planar shape, and wherein the bottom chassis comprises a first bottom surface facing the light guide plate and having a planar shape corresponding to the lower surface of the light guide plate, and a second bottom surface disposed under the first bottom surface and having a curved shape.

2. A display device comprising:

a display panel curved with respect to a plane defined by a first direction and a second direction crossing the first direction about a first reference axis substantially parallel to the first direction;

a light guide plate disposed under the display panel, and comprising: a first surface facing the display panel; and a second surface facing the display panel such that the first surface is disposed between the second surface and the display panel;

a light source which provides a light to the light guide plate; and a bottom chassis which accommodates the light guide plate and the light source, wherein the first surface is curved with respect to the plane about a second reference axis substantially parallel to the first direction, and the second surface is substantially parallel to the plane, wherein the bottom chassis comprises a bottom portion including a first bottom surface and a second bottom surface facing each other, the first bottom surface is disposed between the light guide plate and the second bottom surface, and the second bottom surface has a shape different from the first bottom surface, and wherein the second bottom surface has a curved shape.

3. The display device of claim 2, wherein the display panel has a first radius of curvature, and the first surface of the light guide plate has a second radius of curvature equal to the first radius of curvature.

4. The display device of claim 2, wherein the second surface of the light guide plate comprises an optical pattern defined thereon.

5. The display device of claim 2, wherein a first distance between the display panel and the second surface of the light guide plate at a first position in a center of the display panel is greater than a second distance between the display panel and the second surface of the light guide plate at a second position of the display panel spaced apart from the first position in the second direction, and a first thickness of a portion of the light guide plate overlapping the first position is greater than a second thickness of a portion of the light guide plate overlapping the second position when viewed in a plan view.

6. The display device of claim 2, wherein the bottom chassis further comprises a sidewall portion bent and extending from the bottom portion, wherein the first bottom surface is substantially parallel to the plane.

7. A display device comprising:

a display panel curved with respect to a second direction crossing a first direction about a reference axis extending in the first direction;

a light guide plate disposed under the display panel, and comprising: a first surface curved with respect to the second direction; and a second surface facing the first surface and substantially parallel to a plane defined by the first and second directions;

a light source which provides a light to the light guide plate; and a bottom chassis disposed under the light guide plate and comprising a bottom portion, wherein the bottom portion comprises a first bottom surface and a second bottom surface facing each other, the first bottom surface is disposed between the light guide plate and the second bottom surface, and the second bottom surface has a shape different from the first bottom surface, and wherein a first distance between the display panel and the second surface of the light guide plate at a first position in a center of the display panel is greater than a second distance between the display panel and the second surface of the light guide plate at a second position of the display panel spaced apart from the first position in the second direction, and a first thickness of a portion of the light guide plate overlapping the first position is greater than a second thickness of a portion of the light guide plate overlapping the second position when viewed in a plan view.

8. The display device of claim 7, wherein the light guide plate further comprises a first side surface, a second side surface, a third side surface and a fourth side surface, wherein the first to fourth side surfaces connect the first surface and the second surface, the first and second side surfaces are spaced apart from each other in the first direction to face each other, the third and fourth side surfaces are spaced apart from each other in the second direction to face each other, and the light source is disposed to face at least one of the third and fourth side surfaces to provide the light to the light guide plate.

9. The display device of claim 8, wherein a width in a third direction, which is substantially vertical to the first bottom surface, of each of the third and fourth side surfaces is constant.

10. The display device of claim 9, wherein a width in the third direction of the first side surface decreases as a distance from a center of the first side surface increases, and a width in the third direction of the second side surface decreases as a distance from a center of the second side surface increases.

11. The display device of claim 7, wherein the display panel and the first surface of the light guide plate are curved at a same radius of curvature.

12. The display device of claim 11, wherein a distance in a third direction substantially vertical to the first bottom surface between the display panel and the first surface of the light guide plate is constant.

13. The display device of claim 7, wherein the display panel is curved at a first radius of curvature, the first surface of the light guide plate is curved at a second radius of curvature, and a center of the first radius of curvature is substantially the same as a center of the second radius of curvature.

* * * * *